US011239891B2

(12) United States Patent
Xue et al.

(10) Patent No.: US 11,239,891 B2
(45) Date of Patent: Feb. 1, 2022

(54) UE COOPERATIVE RECEPTION AND COOPERATIVE TRANSMISSION FOR QUALITY OF SERVICE DEMANDING APPLICATIONS

(71) Applicant: QUALCOMM Incorporated, San Diego, CA (US)

(72) Inventors: Yisheng Xue, San Diego, CA (US); Xiaoxia Zhang, San Diego, CA (US); Weiliang Zeng, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/736,750

(22) Filed: Jan. 7, 2020

(65) Prior Publication Data

US 2021/0211169 A1 Jul. 8, 2021

(51) Int. Cl.
| | | |
|---|---|---|
| *H04B 7/06* | (2006.01) | |
| *H04B 7/0456* | (2017.01) | |
| *H04W 16/28* | (2009.01) | |
| *H04W 8/24* | (2009.01) | |
| *H04B 7/024* | (2017.01) | |
| *H01Q 3/26* | (2006.01) | |

(52) U.S. Cl.
CPC .......... *H04B 7/0617* (2013.01); *H04B 7/024* (2013.01); *H04B 7/0456* (2013.01); *H04W 8/24* (2013.01); *H04W 16/28* (2013.01); *H01Q 3/2611* (2013.01)

(58) Field of Classification Search
CPC ..... H04L 27/22; H04L 27/38; H04L 27/0014; H04L 27/14; H04L 2027/0067

USPC .......................................................... 375/329
See application file for complete search history.

(56) References Cited

U.S. PATENT DOCUMENTS

| | | | | |
|---|---|---|---|---|
| 2011/0012787 | A1* | 1/2011 | Na | H01Q 3/2605 342/373 |
| 2015/0171949 | A1* | 6/2015 | Choi | H04B 7/0626 375/267 |
| 2015/0237482 | A1* | 8/2015 | Shin | H04L 12/184 370/312 |

(Continued)

OTHER PUBLICATIONS

International Search Report and Written Opinion—PCT/US2021/012459—ISA/EPO—dated Jun. 4, 2021.

*Primary Examiner* — Shuwang Liu
*Assistant Examiner* — Gina M McKie
(74) *Attorney, Agent, or Firm* — Harrity & Harrity, LLP; Timothy R. Hirzel

(57) ABSTRACT

Various aspects of the present disclosure generally relate to wireless communication. In some aspects, a user equipment (UE) may transmit, to a base station, a report indicating that a cooperative reception group including the UE and one or more other UEs connected to the UE over an out-of-band link supports one or more downlink transmit beamforming techniques. The UE may determine, based at least in part on the one or more downlink transmit beamforming techniques supported by the cooperative reception group, a downlink transmit precoder associated with relaxed beamforming nulling. The UE may decode a downlink transmission received from the base station based at least in part on the downlink transmit precoder and one or more decoded bits received from the one or more other UEs in the cooperative reception group. Numerous other aspects are provided.

30 Claims, 14 Drawing Sheets

(56) References Cited

U.S. PATENT DOCUMENTS

| | | |
|---|---|---|
| 2017/0272134 A1* | 9/2017 | Yuan .................. H04W 52/325 |
| 2019/0239118 A1 | 8/2019 | Baghel et al. |
| 2019/0312616 A1 | 10/2019 | Christoffersson et al. |
| 2020/0008230 A1 | 1/2020 | Yu et al. |

* cited by examiner

UE COOPERATIVE RECEPTION AND COOPERATIVE TRANSMISSION FOR QUALITY OF SERVICE DEMANDING APPLICATIONS

FIELD OF THE DISCLOSURE

Aspects of the present disclosure generally relate to wireless communication and to techniques and apparatuses for user equipment (UE) cooperative reception and cooperative transmission for quality of service (QoS) demanding applications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: transmitting, to a base station, a report indicating that a cooperative reception group supports one or more downlink transmit beamforming techniques, wherein the cooperative reception group includes the UE and one or more other UEs connected to the UE over an out-of-band link; determining, based at least in part on the one or more downlink transmit beamforming techniques supported by the cooperative reception group, a downlink transmit precoder associated with relaxed beamforming nulling; receiving a downlink transmission from the base station and one or more decoded bits associated with the downlink transmission from the one or more other UEs in the cooperative reception group; and decoding the downlink transmission based at least in part on the downlink transmit precoder and the one or more decoded bits received from the one or more other UEs in the cooperative reception group.

In some aspects, a UE for wireless communication may include a memory and one or more processors operatively coupled to the memory. The memory and the one or more processors may be configured to: transmit, to a base station, a report indicating that a cooperative reception group supports one or more downlink transmit beamforming techniques, wherein the cooperative reception group includes the UE and one or more other UEs connected to the UE over an out-of-band link; determine, based at least in part on the one or more downlink transmit beamforming techniques supported by the cooperative reception group, a downlink transmit precoder associated with relaxed beamforming nulling; receive a downlink transmission from the base station and one or more decoded bits associated with the downlink transmission from the one or more other UEs in the cooperative reception group; and decode the downlink transmission based at least in part on the downlink transmit precoder and the one or more decoded bits received from the one or more other UEs in the cooperative reception group.

In some aspects, a non-transitory computer-readable medium may store one or more instructions. The one or more instructions, when executed by one or more processors of a UE, may cause the one or more processors to: transmit, to a base station, a report indicating that a cooperative reception group supports one or more downlink transmit beamforming techniques, wherein the cooperative reception group includes the UE and one or more other UEs connected to the UE over an out-of-band link; determine, based at least in part on the one or more downlink transmit beamforming techniques supported by the cooperative reception group, a downlink transmit precoder associated with relaxed beamforming nulling; receive a downlink transmission from the base station and one or more decoded bits associated with the downlink transmission from the one or more other UEs in the cooperative reception group; and decode the downlink transmission based at least in part on the downlink transmit precoder and the one or more decoded bits received from the one or more other UEs in the cooperative reception group.

In some aspects, an apparatus for wireless communication may include: means for transmitting, to a base station, a report indicating that a cooperative reception group supports one or more downlink transmit beamforming techniques, wherein the cooperative reception group includes the apparatus and one or more UEs connected to the apparatus over an out-of-band link; means for determining, based at least in part on the one or more downlink transmit beamforming techniques supported by the cooperative reception group, a downlink transmit precoder associated with relaxed beamforming nulling; means for receiving a downlink transmission from the base station and one or more decoded bits associated with the downlink transmission from the one or more UEs in the cooperative reception group; and means for decoding the downlink transmission based at least in part on the downlink transmit precoder and the one or more decoded bits received from the one or more UEs in the cooperative reception group.

In some aspects, a method of wireless communication, performed by a UE, may include: transmitting, to a base station, a report indicating that a cooperative transmission group supports one or more uplink transmit beamforming techniques, wherein the cooperative transmission group includes the UE and one or more other UEs connected to the UE over an out-of-band link; determining, based at least in part on the one or more uplink transmit beamforming techniques supported by the cooperative transmission group, a transmit precoder to be used for an uplink transmission; and transmitting, jointly with the one or more other UEs in the cooperative transmission group, the uplink transmission to the base station based at least in part on the transmit precoder.

In some aspects, a UE for wireless communication may include a memory and one or more processors operatively coupled to the memory. The memory and the one or more processors may be configured to: transmit, to a base station, a report indicating that a cooperative transmission group supports one or more uplink transmit beamforming techniques, wherein the cooperative transmission group includes the UE and one or more other UEs connected to the UE over an out-of-band link; determine, based at least in part on the one or more uplink transmit beamforming techniques supported by the cooperative transmission group, a transmit precoder to be used for an uplink transmission; and transmit, jointly with the one or more other UEs in the cooperative transmission group, the uplink transmission to the base station based at least in part on the transmit precoder.

In some aspects, a non-transitory computer-readable medium may store one or more instructions. The one or more instructions, when executed by one or more processors of a UE, may cause the one or more processors to: transmit, to a base station, a report indicating that a cooperative transmission group supports one or more uplink transmit beamforming techniques, wherein the cooperative transmission group includes the UE and one or more other UEs connected to the UE over an out-of-band link; determine, based at least in part on the one or more uplink transmit beamforming techniques supported by the cooperative transmission group, a transmit precoder to be used for an uplink transmission; and transmit, jointly with the one or more other UEs in the cooperative transmission group, the uplink transmission to the base station based at least in part on the transmit precoder.

In some aspects, an apparatus for wireless communication may include: means for transmitting, to a base station, a report indicating that a cooperative transmission group supports one or more uplink transmit beamforming techniques, wherein the cooperative transmission group includes the apparatus and one or more UEs connected to the apparatus over an out-of-band link; means for determining, based at least in part on the one or more uplink transmit beamforming techniques supported by the cooperative transmission group, a transmit precoder to be used for an uplink transmission; and means for transmitting, jointly with the one or more UEs in the cooperative transmission group, the uplink transmission to the base station based at least in part on the transmit precoder.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
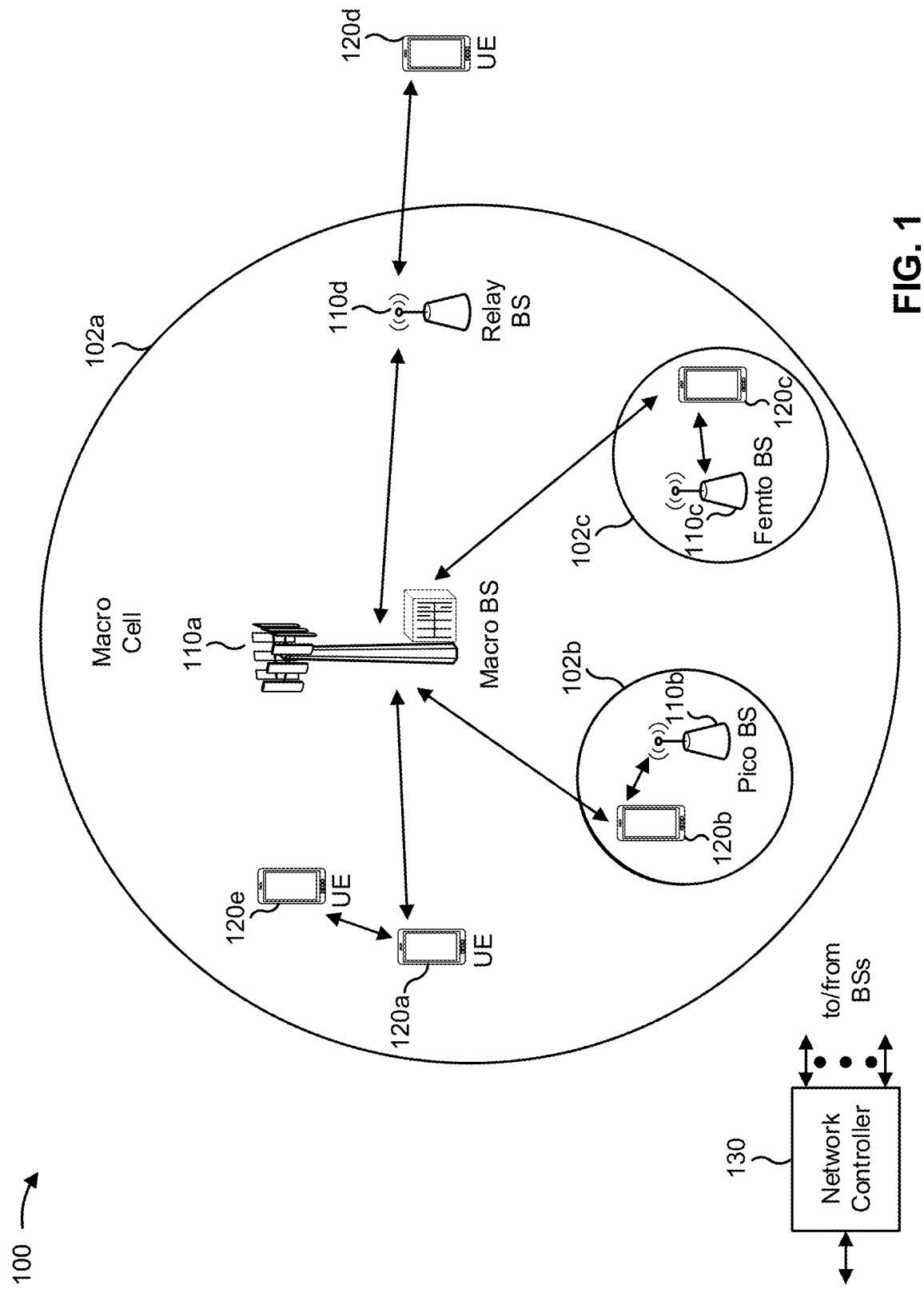
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
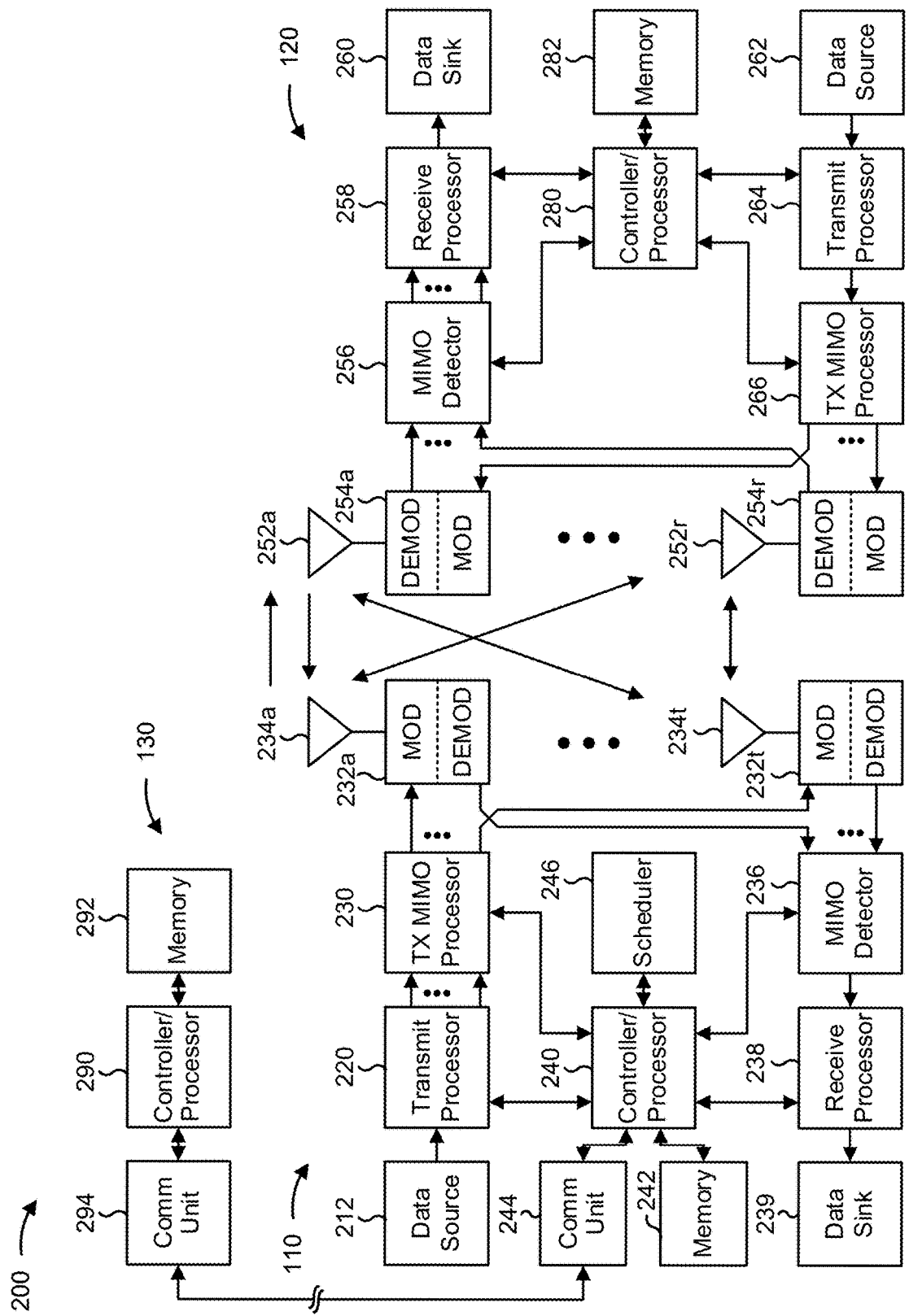
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE cooperative reception and cooperative transmission for quality of service (QoS) demanding applications, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, UE 120 may include means for transmitting, to base station 110, a report indicating that a cooperative reception group supports one or more downlink transmit beamforming techniques, wherein the cooperative reception group includes UE 120 and one or more other UEs 120 connected to UE 120 over an out-of-band link, means for determining, based at least in part on the one or more downlink transmit beamforming techniques supported by the cooperative reception group, a downlink transmit precoder associated with relaxed beamforming nulling, means for receiving a downlink transmission from base station 110 and one or more decoded bits associated with the downlink transmission from the one or more other UEs 120 in the cooperative reception group, means for decoding the downlink transmission based at least in part on the downlink transmit precoder and the one or more decoded bits received from the one or more other UEs 120 in the cooperative reception group, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Additionally, or alternatively, in some aspects, UE 120 may include means for transmitting, to base station 110, a report indicating that a cooperative transmission group supports one or more uplink transmit beamforming techniques, wherein the cooperative transmission group includes UE 120 and one or more other UEs 120 connected to UE 120 over an out-of-band link, means for determining, based at least in part on the one or more uplink transmit beamforming techniques supported by the cooperative transmission group, a transmit precoder to be used for an uplink transmission, means for transmitting, jointly with the one or more other UEs 120 in the cooperative transmission group, the uplink transmission to base station 110 based at least in part on the transmit precoder, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
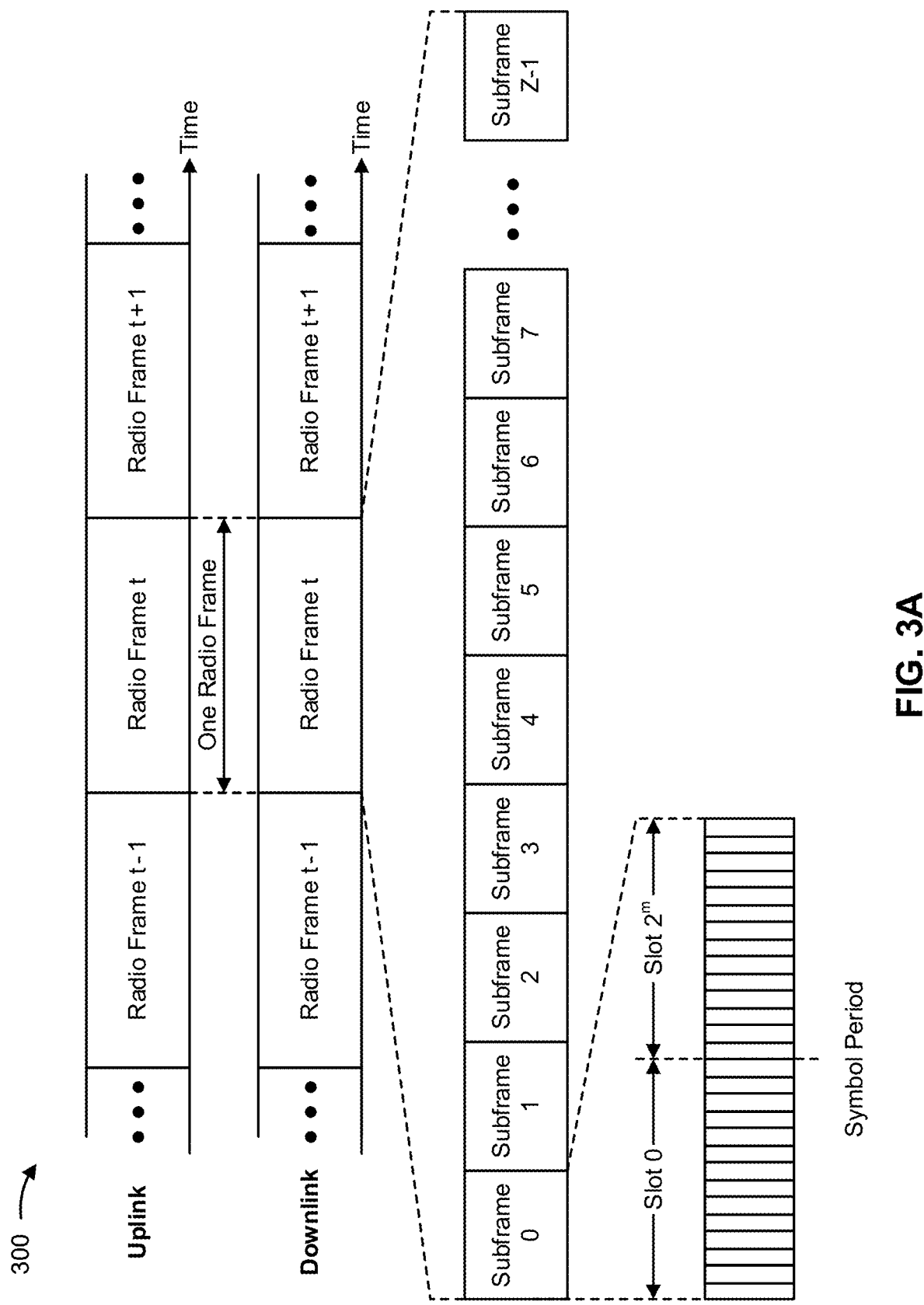
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
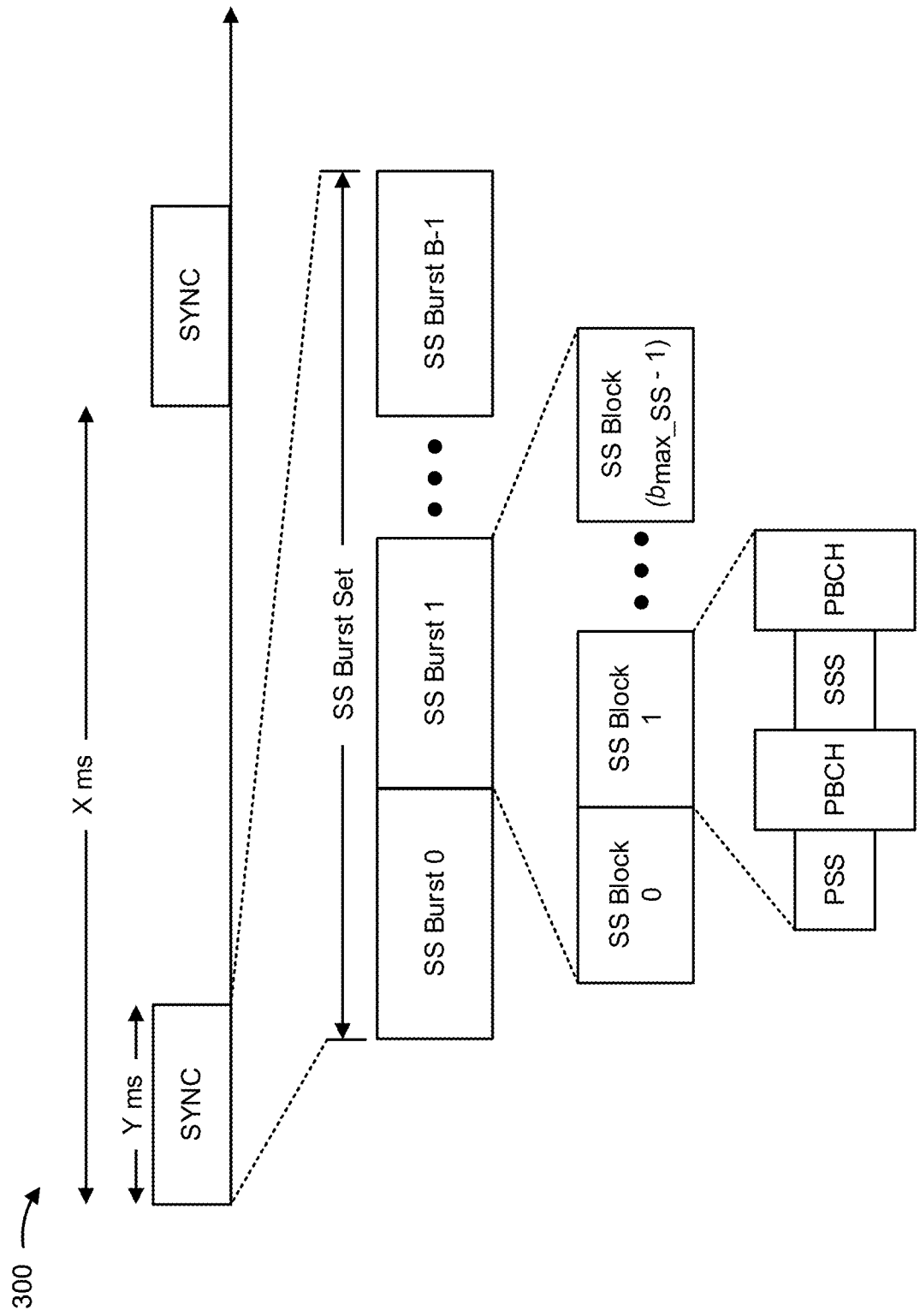
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
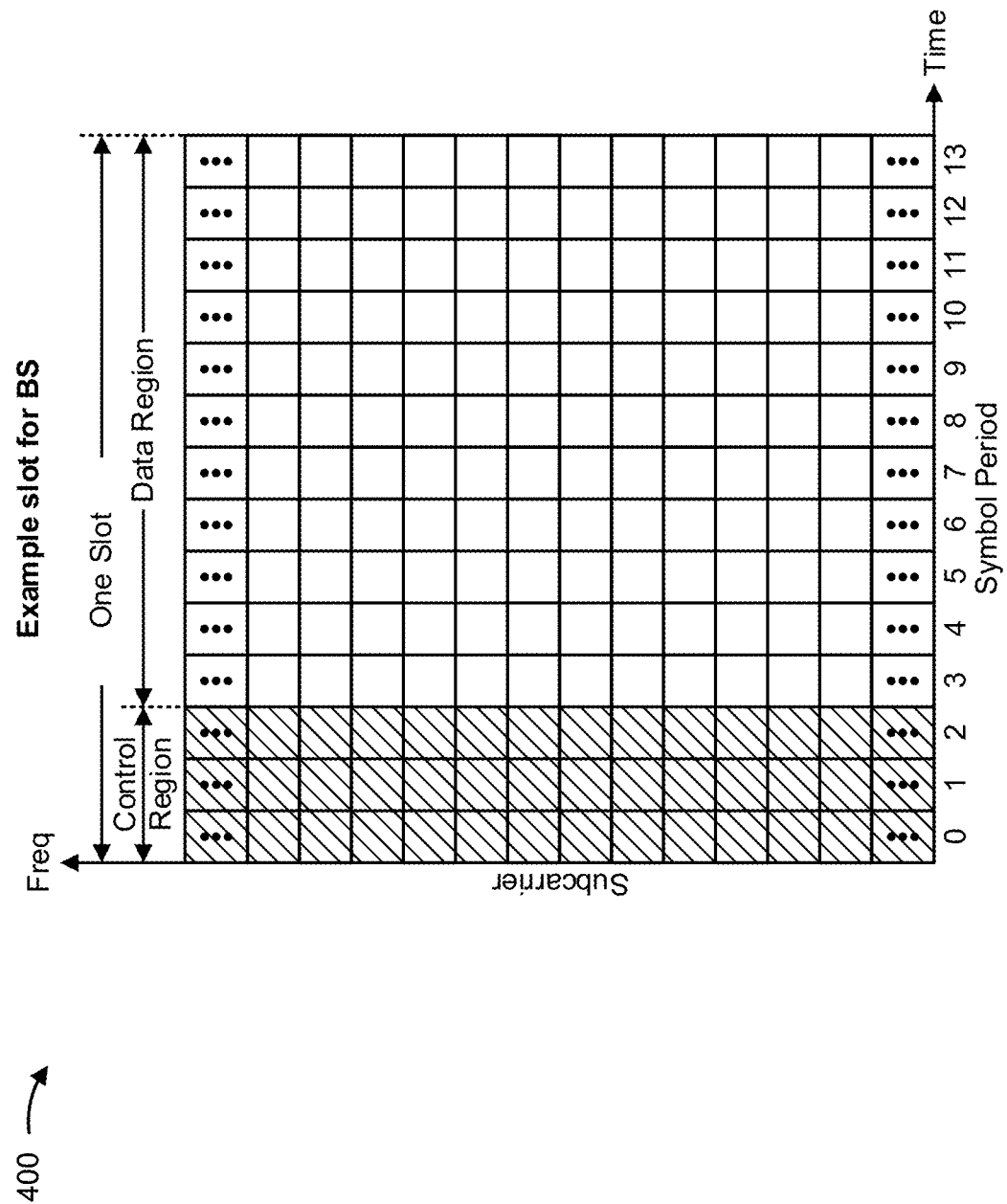
FIG. 4 is a block diagram conceptually illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
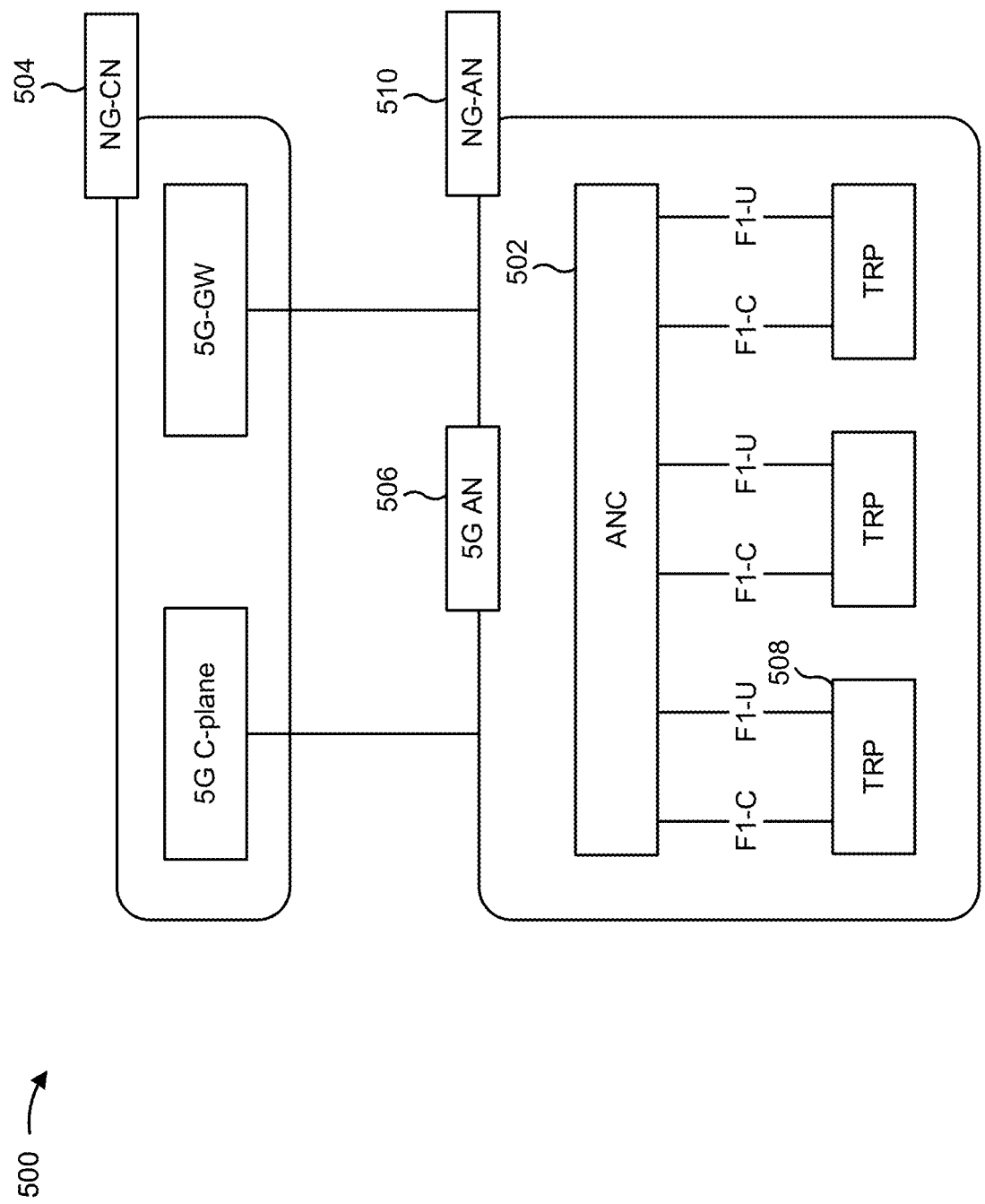
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, jitter, and/or the like).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
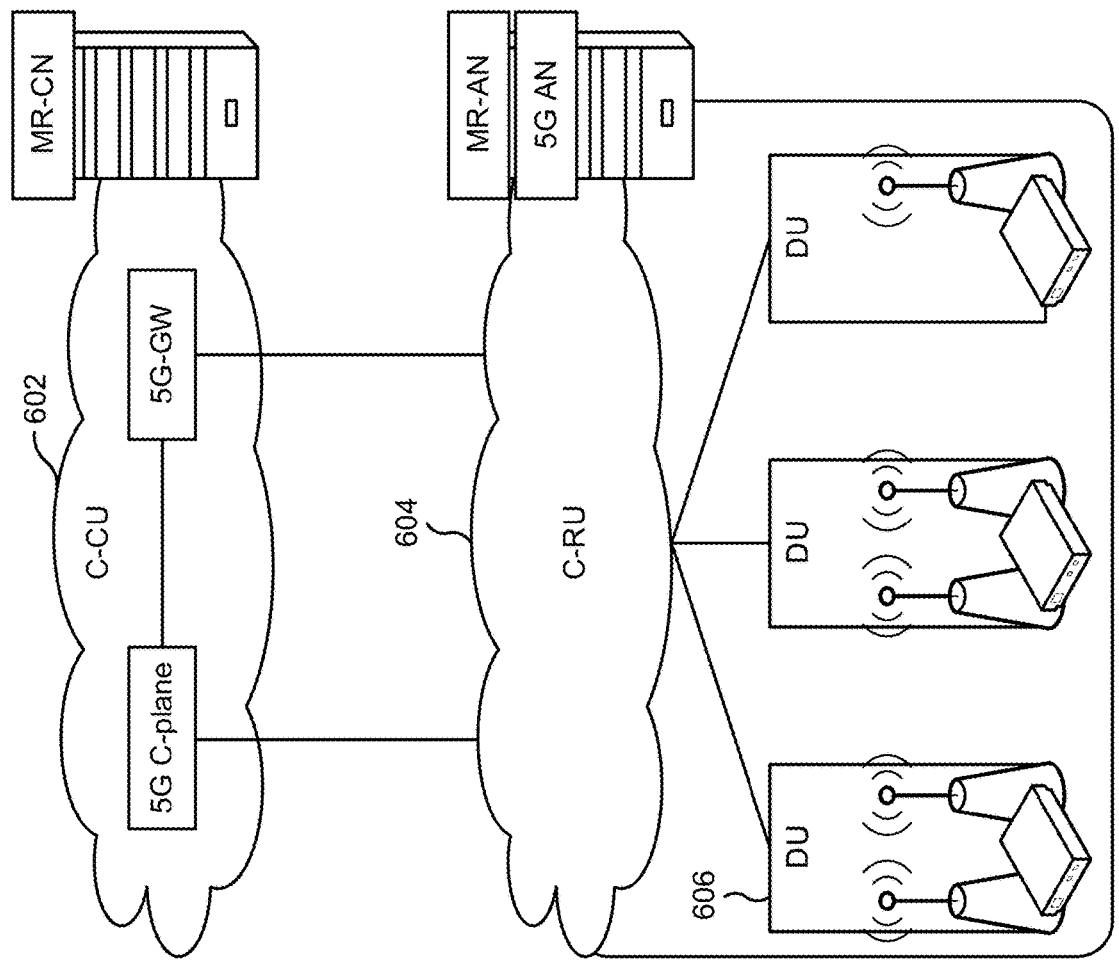
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In a wireless communication system, coordinated multi-point (CoMP) techniques may be implemented to improve performance (e.g., capacity, reliability, throughput, latency, and/or the like) for communication within the wireless communication system through spatial diversity. For example, multiple transmit receive points (TRPs) (e.g., base stations, antennas or antenna arrays associated with a base station, DUs, and/or the like) may be spatially distributed throughout the wireless communication system to enable communication between the TRPs distributed at various locations and one or more UEs in the wireless communication system. Accordingly, the spatial diversity can be scaled to combat shadowing (e.g., when one or more devices, objects, or structures are present within a communication path between the UE and one or more of the TRPs). In this way, CoMP techniques may be used to coordinate transmissions from the TRPs to the UEs and to coordinate reception of transmissions from the UEs to the TRPs to attempt to ensure that mission-critical traffic is properly handled, to satisfy performance requirements associated with applications that demand a high quality of service (QoS), and/or the like (e.g., augmented reality, virtual reality, gaming, vehicle-to-everything communication, and/or the like). For example, network-side CoMP techniques may enable support for large bandwidths (e.g., 100 MHz for frequency range 1 (FR1), which includes sub-6 GHz frequencies), shortened transmission time intervals and/or timelines, advanced MIMO, reduced inter-cell interference (e.g., in dense deployments), and/or the like.

Accordingly, network-side CoMP techniques can provide significant performance improvements to support applications with high QoS demands (e.g., eMBB, URLLC, factory automation, and/or the like) by exploiting spatial diversity, macro diversity, progress in backhaul and/or fronthaul technologies, increases in network-side computation power, and/or the like. However, despite the performance improvements offered by network-side CoMP techniques, UEs can often be a bottleneck in serving QoS-demanding applications. For example, many UEs (e.g., smartphones, wearable devices, and/or the like) have small form factors that may limit a quantity of antennas that can be deployed (e.g., due to antenna size). Furthermore, even in cases of UEs that have a larger form factor that can accommodate more antennas (e.g., a wireless router, a desktop computer, a smart appliance, and/or the like), the UEs may still have difficulty supporting high QoS demands due to strong MIMO channel correlation, reduced rank, and/or the like. Accordingly, in many cases, UE limitations may constrain overall performance for QoS-demanding applications (e.g., increasing latency) because the UEs may consume a significant proportion of the total airtime.

Some aspects described herein provide techniques and apparatuses to enable CoMP techniques, including cooperative reception and/or cooperative transmission, among multiple UEs that are connected via an out-of-band link. For example, in some aspects, the out-of-band link connecting the multiple UEs may be established via one or more technologies that support high data rates (e.g., 802.11ad technology that utilizes the 60 GHz mmW frequency band to support multi-gigabit data rates, Universal Serial Bus (USB) technologies that can be used to establish wireline inter-UE connections that support multi-gigabit data rates, and/or the like), and the high data rate of the out-of-band link may be utilized in combination with increased processing power of the UEs to enable joint processing of network traffic among multiple UEs in a cooperative group. In this way, multiple UEs that are in proximity to one another (e.g., within sufficient proximity to establish a wireless or wireline device-to-device (D2D) or sidelink connection) may form a UE cooperation group that can jointly communicate with one or more devices (e.g., base stations, TRPs, and/or the like) in a wireless network to support network services that may have high QoS demands.

For example, in a similar manner as network-side CoMP techniques can handle imbalanced traffic within a coverage area by pooling network communication and/or processing resources, enabling multiple UEs to form a UE cooperation group that can jointly process uplink and/or downlink transmissions may provide additional capabilities to handle traffic imbalances at a smaller granularity. For example, in network-side CoMP communication, there may be more UEs located near a specific base station, TRP, and/or the like compared to other base stations, TRPs, and/or the like, and network-side CoMP techniques may offer performance improvements to handle such imbalances. In a similar respect, there may be cases where a group of UEs that are located in proximity to one another includes only a small quantity of UEs that are utilizing applications that have high QoS demands. In such cases, implementing CoMP techniques to enable cooperation among the group of UEs may enable communication and/or processing resources associated with the group of UEs to be pooled or otherwise aggregated to handle imbalanced traffic requirements, which reduces a risk that the UE(s) utilizing the applications that have the high QoS demands will be a bottleneck.

Figure 7A:
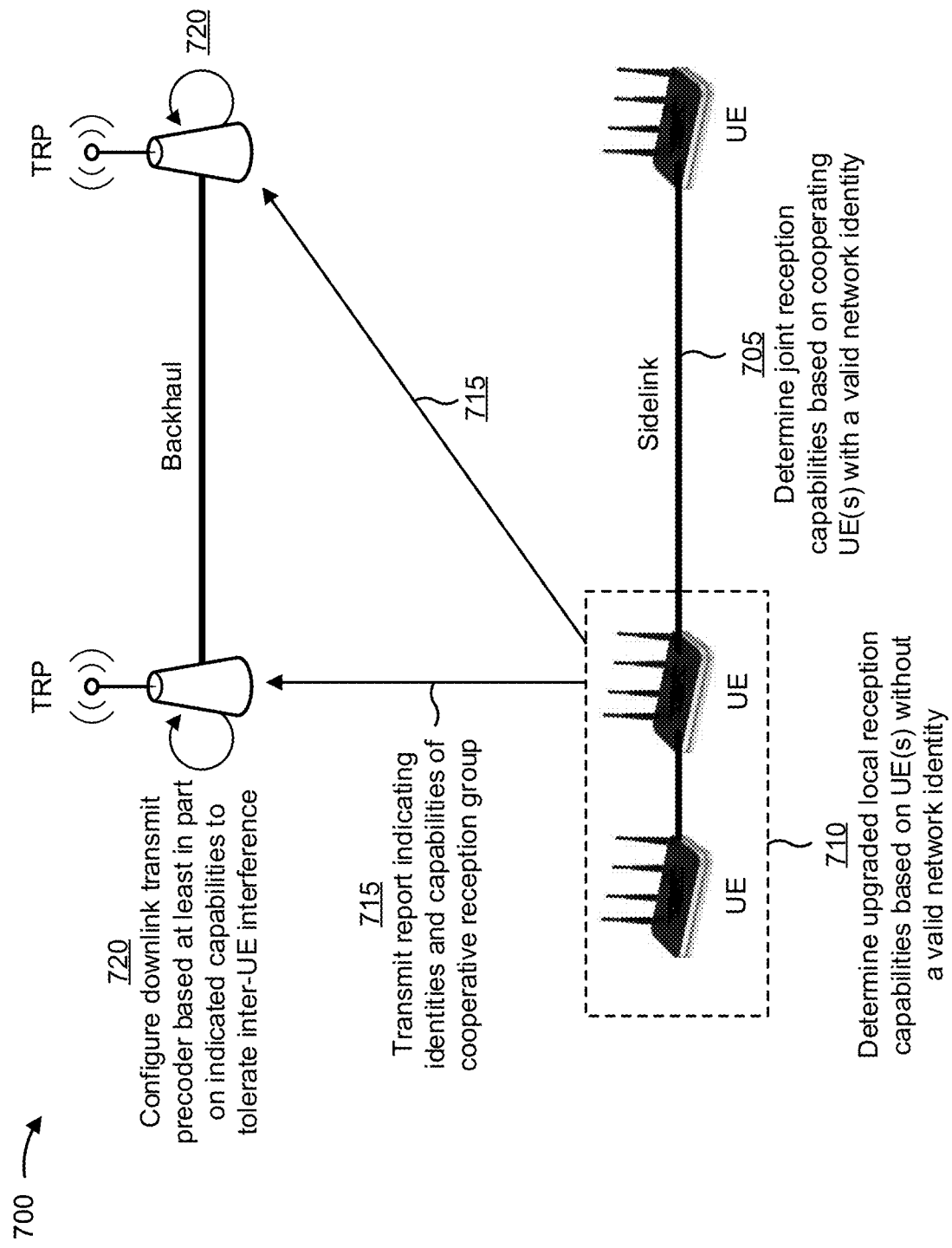
FIGS. 7A-7B are diagrams illustrating one or more example implementations of UE cooperative reception for QoS demanding applications, in accordance with various aspects of the present disclosure.
Figure 7B:
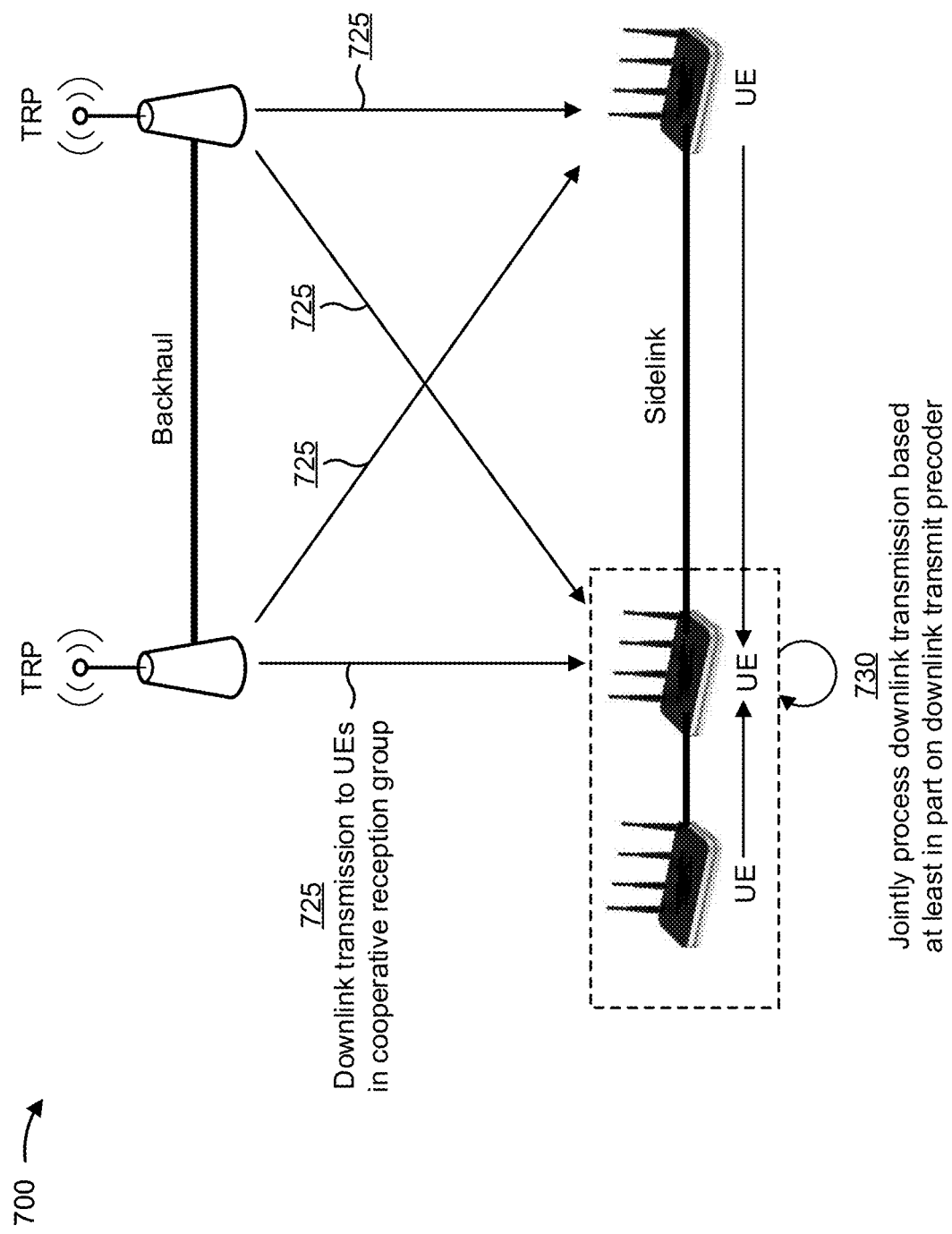

FIGS. 7A-7B are diagrams illustrating one or more example implementations 700 of UE cooperative reception for QoS demanding applications, in accordance with various aspects of the present disclosure. As shown in FIGS. 7A-7B, example implementation(s) 700 may include multiple UEs that can communicate with one or more TRPs in a CoMP network, where each TRP may be a base station, an antenna of a base station, a DU, and/or the like. In some aspects, as shown in FIGS. 7A-7B, the CoMP network may include multiple TRPs that can send information to and/or receive information from the various UEs to improve performance (e.g., in case of dynamic network conditions, poor network conditions, and/or the like). For example, a cluster of TRPs may be used to serve the UEs in the CoMP network to provide spatial diversity, reduce latency, improve reliability, satisfy QoS requirements, and/or the like. In some aspects, the multiple TRPs may use different frequency bands for communication. For example, the coordinated multipoint network may be a frequency reuse network (e.g., may employ frequency reuse across TRPs), where different TRPs reuse frequency bands, but adjacent TRPs use different frequency bands to mitigate interference. In this case, the first TRP and the second TRP may be adjacent TRPs or may otherwise use different frequency bands for communication (e. g, according to a frequency reuse pattern employed by the CoMP network). Furthermore, although the CoMP network is shown in FIGS. 7A-7B as including two TRPs, in practice, the CoMP network may include more than two TRPs. Alternatively, in some aspects, the CoMP network may include a single TRP that handles traffic for multiple UEs (e.g., in a downlink massive MIMO deployment) that communicate with the single TRP using CoMP techniques. In addition, while the multiple UEs in FIGS. 7A-7B are illustrated as wireless routers, this is for illustration purposes only and the multiple UEs can have any suitable configuration, form factor, and/or the like.

In some aspects, in cases where the CoMP network includes multiple TRPs (e.g., as in the example implementation(s) 700 shown in FIGS. 7A-7B), the multiple TRPs may communicate with the UEs in a coordinated manner to improve reliability, increase throughput, and/or the like. For example, in some aspects, the TRPs may coordinate communications with the UEs via a backhaul, which may have a smaller delay or a higher capacity when the TRPs are co-located at a particular base station (e.g., where the TRPs are different antenna arrays of the same base station). Additionally, or alternatively, the backhaul may have a larger delay or a lower capacity when the TRPs are located at different base stations. In some cases, the backhaul may be an ideal backhaul, such as a backhaul associated with a threshold latency or a backhaul that permits joint scheduling of the multiple TRPs. In some other cases, the backhaul may be a non-ideal backhaul, such as a backhaul with a latency that fails to satisfy a threshold or that does not permit joint scheduling.

In some aspects, the TRPs may coordinate communications with the UEs in the CoMP network using coordinated scheduling and/or coordinated beamforming. For example, in coordinated scheduling, the TRPs may communicate with a controller (e.g., a network controller, a controller/processor of a base station, an ANC, a C-RU, and/or the like), which may perform centralized scheduling for transmissions to one or more UEs by multiple TRPs. In some aspects, the transmissions may be scheduled to occur at substantially the same time (e.g., using the same frequency or different frequencies), or the transmissions may be scheduled to occur at different times (e. g., using the same frequency or different frequencies) to improve reception by the UE(s). In some aspects, the controller may instruct the TRPs to transmit using joint transmission, where multiple TRPs transmit the same information to a particular UE in the same time slot using coordinated beamforming (e.g., with appropriate beamforming weights applied to transmissions by different TRPs). Additionally, or alternatively, in some aspects, the controller may instruct the TRPs to transmit using dynamic point selection (DPS), where a single TRP transmits information to a particular UE per time slot (e.g., using appropriate beamforming, which may be indicated to the TRP by the controller), and where different TRPs may be scheduled for transmission to the UE in different time slots. In this way, performance may be improved by dynamically scheduling different TRPs to transmit information to the UE based at least in part on channel conditions, which may account for shadowing, channel fading, and/or the like.

In some cases, when the TRPs use coordinated beamforming to transmit to multiple UEs in the CoMP network without cooperation among the multiple UEs, block-diagonal zero-forcing (BD-ZF) precoding, or null steering precoding, can be used to suppress multi-user interference. For example, given a downlink channel, H, and a downlink transmit precoder that employs BD-ZF precoding, $W_{ZF-BD}$, the BD-ZF precoding may yield a matrix with beamforming weights as follows:

$$H \cdot W_{ZF-BD} = \begin{bmatrix} A & 0 \\ 0 & B \end{bmatrix}$$

where A and B are non-zero matrices respectively associated with a first UE and a second UE, and the zero matrices in each row results in beamforming nulling towards the other UE. However, while BD-ZF precoding may suppress multi-user interference, in some cases, BD-ZF precoding can lead to degraded system performance. For example, when beamforming nulling towards the second UE is performed while transmitting a beam that is steered towards the first UE, at least some useful signal energy towards the first UE is reduced. Similarly, when beamforming nulling towards the first UE is performed while transmitting a beam that is steered towards the second UE, at least some useful signal energy towards the second UE is reduced. For at least these reasons, networks that use CoMP techniques on a downlink often do not serve nearby UEs within a downlink CoMP transmission opportunity (TxOP) to avoid a need to utilize BD-ZF precoding that may degrade performance for the nearby UEs.

Accordingly, as described herein, some aspects may enable cooperative reception among multiple UEs, in which at least some network-side nulling can be relaxed (e.g., reduced or eliminated) based on serial interference cancellation (SIC) techniques supported at the cooperating UEs. For example, in cases where one or more decoded bits at a second UE can be transferred to a first UE over an out-of-band link (e.g., a wireline or wireless sidelink), the TRPs in the CoMP network may construct a downlink transmit precoder with relaxed beamforming nulling, $W_{SIC-BD}$, as follows:

$$H \cdot W_{SIC-BD} = \begin{bmatrix} A & C \\ 0 & B \end{bmatrix}$$

where C is a non-zero matrix associated with the second UE. In other words, when a TRP transmits a beam steered towards the first UE, the non-zero matrix C may result in at least some useful signal energy being received at the second UE, which may decode and transfer one or more bits of a downlink transmission to the first UE over the out-of-band link. Furthermore, in cases where the inter-UE out-of-band link satisfies one or more performance criteria (e.g., when the inter-UE out-of-band link supports a data rate that is powerful enough to deliver in-phase and quadrature (IQ) samples), singular value decomposition (SVD)-based transmit beamforming with no nulling can be used.

Accordingly, as shown in FIG. 7A, and by reference number 705, a UE in a cooperative reception group may determine one or more joint reception capabilities associated with the cooperative reception group based at least in part on one or more properties of an out-of-band link (or sidelink) connecting the UE to other UEs that have a valid network identity. For example, in some aspects, the CoMP network may be associated with a particular mobile network operator (MNO), and the UE and one or more of the other UEs in the cooperative reception group may have a subscription with the particular MNO. Accordingly, in some aspects, the UE may determine a network-allocated identifier (e.g., a cell radio network temporary identity (C-RNTI)) associated with the other UEs that have a valid network identity and further determine one or more properties of the out-of-band link connecting the UE to such other UEs.

For example, in some aspects, the UE may determine whether the out-of-band link supports a data rate or other performance characteristic that enables the other cooperating UEs to deliver IQ samples over the out-of-band link. Additionally, or alternatively, the UE may determine one or more serial interference cancellation techniques that can be supported over the out-of-band link. For example, the UE may determine a communication direction in which serial interference cancellation is supported, a number of spatial layers in which serial interference cancellation is supported, a number of resource blocks in which serial interference cancellation is supported, a timeline associated with a given modulation coding scheme (MCS) and transport block size (TBS), and/or the like.

Additionally, or alternatively, in some aspects, one or more of the UEs in the cooperative reception group may lack a valid network identity that enables the TRP(s) to schedule a downlink transmission to such UEs. For example, the cooperative reception group may include one or more UEs that are associated with a different MNO. Accordingly, as further shown in FIG. 7A, and by reference number 710, the UE may determine upgraded local reception capabilities based at least in part on reception capabilities associated with one or more UEs that are connected to the UE over an out-of-band link but lack a valid network identity that enables the TRP(s) to schedule a downlink transmission to such UEs. For example, assuming that the UE has a 4×4 antenna panel and is connected to another UE that has a 4×4 antenna panel but no valid network identity to enable communication with the TRP(s) in the CoMP network, the UE may determine a temporary upgraded reception capability that includes two 4×4 antenna panels that can be used for joint processing on a downlink.

As further shown in FIG. 7A, and by reference number 715, the UE may transmit, to one or more TRPs in the CoMP network, a report that indicates network identities and capabilities of the cooperative reception group. For example, in some aspects, the report may include a network identity associated with the UE transmitting the report and network identities associated with any cooperating UEs that have a valid network identity (e.g., a C-RNTI) that enables the TRP(s) to communicate with the cooperating UEs. Furthermore, the capabilities indicated in the report may generally relate to capabilities of the various UEs in the cooperative reception group to tolerate inter-UE interference. Furthermore, in some aspects, the report may be associated with a timer to indicate a valid time period associated with the cooperative reception group (e.g., a time period during which the multiple UEs in the cooperative reception group will be pooling communication and/or processing resources to jointly process downlink transmissions that are directed to a particular UE in the cooperative reception group).

In some aspects, such as in cases where the inter-UE out-of-band link satisfies certain performance criteria (e.g., enabling full cooperation through delivery of IQ samples over the out-of-band link), the report may indicate that the cooperative reception group has capabilities to support SVD-based transmit beamforming with no nulling. Additionally, or alternatively, the report may indicate the serial interference cancellation techniques supported by the cooperative reception group, such as the communication direction in which serial interference cancellation is supported (e.g., defined according to network identities, such as from a first C-RNTI to a second C-RNTI), the number of spatial layers in which serial interference cancellation is supported, the number of resource blocks in which serial interference cancellation is supported, the timeline associated with a given MCS and TBS (e.g., based at least in part on an amount of time the UE needs to decode a downlink transmission), and/or the like. Additionally, or alternatively, in cases where the cooperative reception group includes one or more cooperating UEs without a valid network identity in the CoMP network, the report may indicate the upgraded reception capabilities that combines reception capabilities of the UE transmitting the report with reception capabilities of the other UE(s) lacking a valid network identity.

As further shown in FIG. 7A, and by reference number 720, the one or more TRPs may configure a downlink transmit precoder based at least in part on the capabilities indicated in the report that relate to an ability of the cooperative reception group to tolerate inter-UE interference. In some aspects, as described herein, the downlink transmit precoder configured by the TRP(s) may generally be associated with relaxed beamforming nulling. For example, in cases where the report indicates that the cooperative reception group supports SVD-based transmit beamforming, the downlink transmit precoder may include no nulling to suppress inter-UE interference. Alternatively, in cases where the report does not indicate that the cooperative reception group supports SVD-based transmit beamforming but includes information related to inter-UE serial interference cancellation supported in the cooperative reception group, the downlink transmit precoder configured by the TRP(s) may employ relaxed BD-ZF nulling. For example, in some aspects, the TRPs may construct a downlink transmit precoder with relaxed beamforming nulling, W SIC-BD, as described above. In some aspects, the TRP(s) may transmit, to the UEs in the cooperative reception group that have valid network identities, information related to the configured downlink transmit precoder (e.g., in a message scheduling a downlink transmission to the cooperative reception group).

As shown in FIG. 7B, and by reference number 725, the one or more TRPs may transmit, and the UEs in the cooperative reception group may receive, a downlink transmission that is transmitted using the configured downlink transmit precoder. As further shown in FIG. 7B, and by reference number 730, the UEs in the cooperative reception group may jointly process the downlink transmission based at least in part on the downlink transmit precoder. For example, the other UEs in the cooperative reception group may provide, to the UE, one or more decoded bits of the downlink transmission, one or more IQ samples obtained from the downlink transmission, and/or the like, whereby the UE may decode the full downlink transmission based at least in part on signal energy received at the UE and information provided by the other UEs in the cooperative reception group. For example, in cases where the cooperative reception group supports serial interference cancellation, the signal received at the UE may include a portion that is targeted (e.g., steered) towards the UE and an interference term based at least in part on a portion of the signal that is targeted towards the other UEs in the cooperative reception group. Accordingly, the UE may use the downlink transmit precoder to determine an interference term to be subtracted from the signal received at the UE (e.g., based on the decoded bits, IQ samples, and/or the like received from the other UEs in the cooperative reception group), which can be used to decode the downlink transmission in combination with the information received from the cooperating UEs.

As indicated above, FIGS. 7A-7B are provided as one or more examples. Other examples may differ from what is described with respect to FIGS. 7A-7B.

Figure 8A:
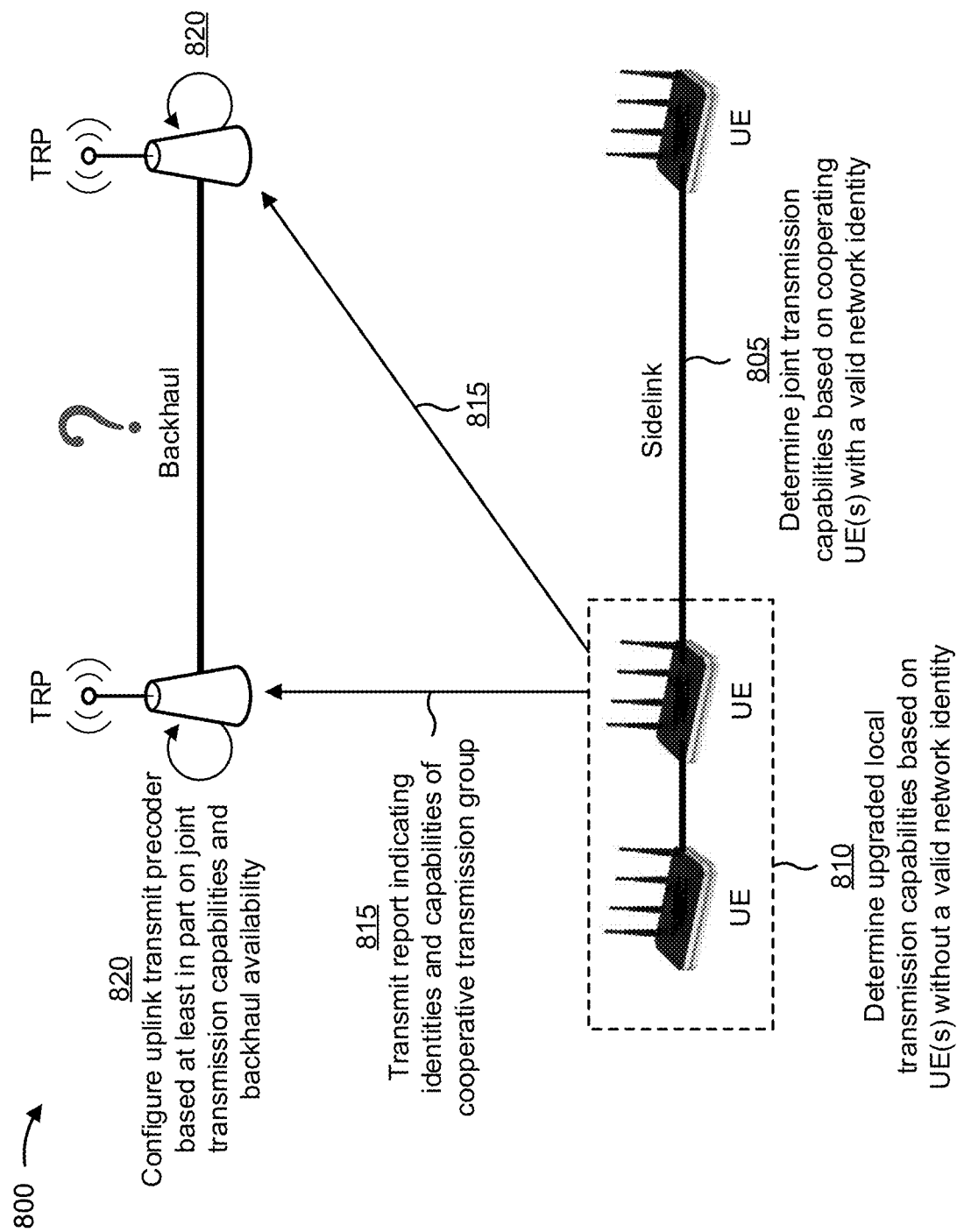
FIGS. 8A-8C are diagrams illustrating one or more example implementations of UE cooperative transmission for QoS demanding applications, in accordance with various aspects of the present disclosure.
Figure 8B:
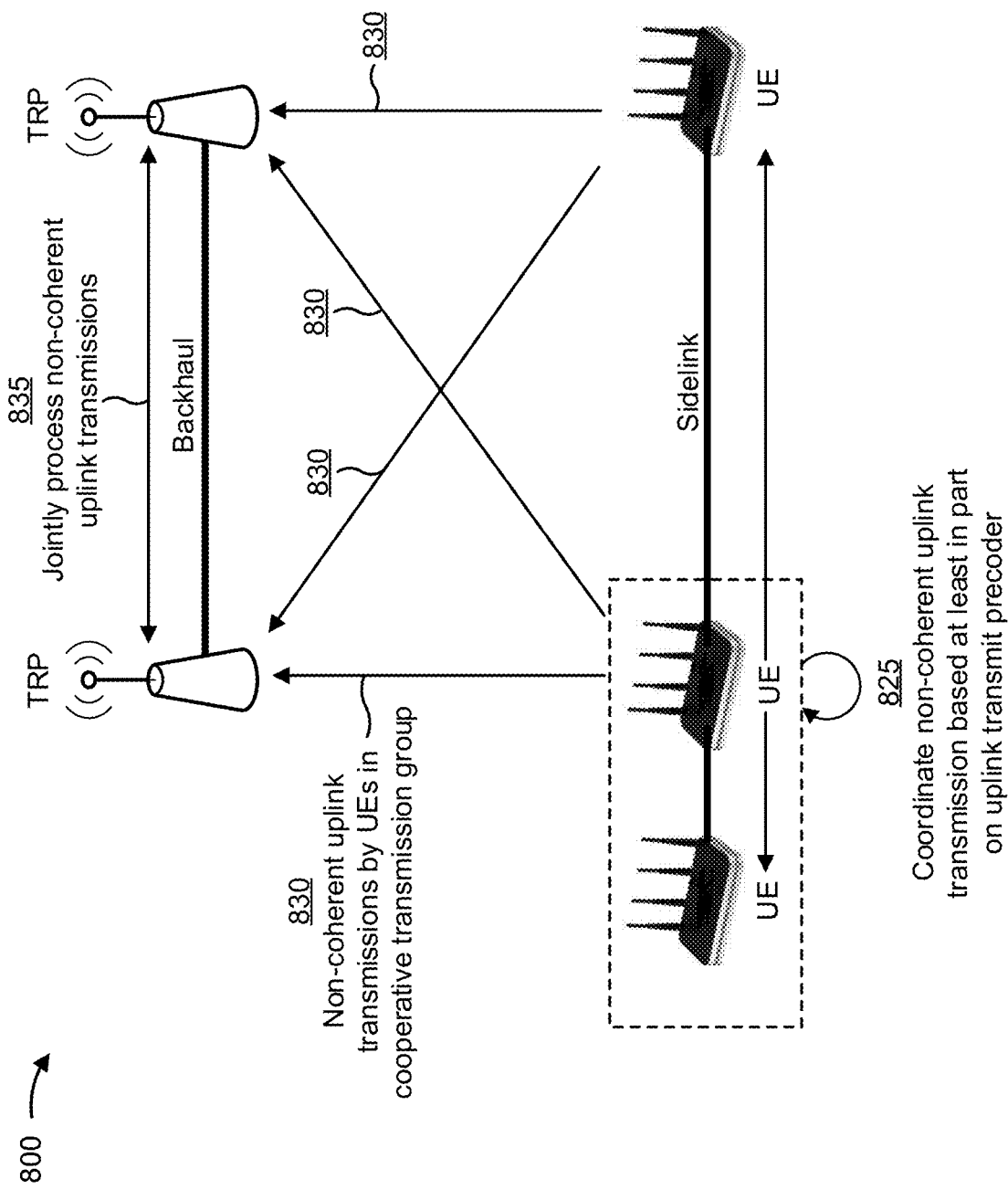
Figure 8C:
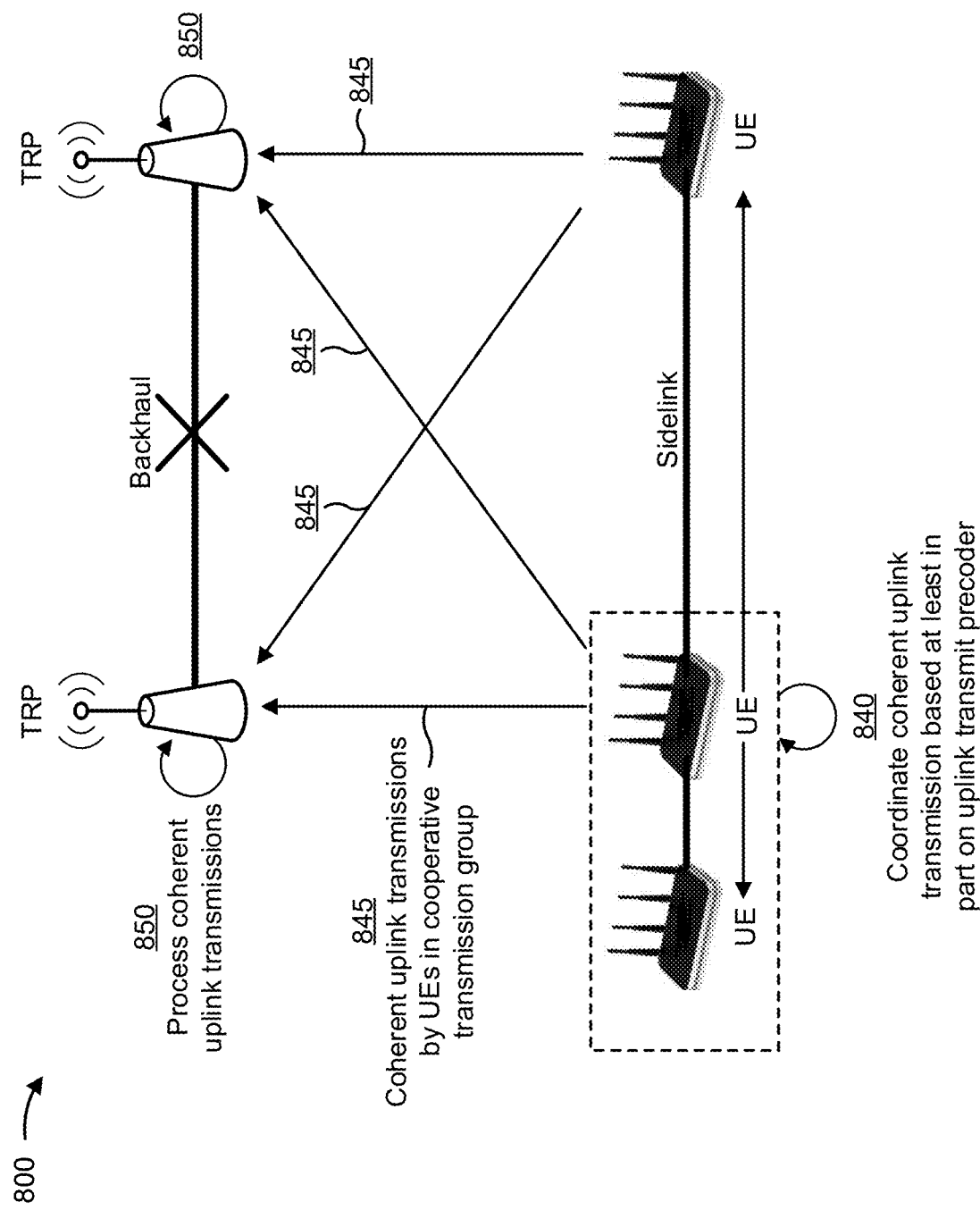

FIGS. 8A-8C are diagrams illustrating one or more example implementations 800 of UE cooperative transmission for QoS demanding applications, in accordance with various aspects of the present disclosure. As shown in FIGS. 8A-8C, example implementation(s) 800 may include multiple UEs that can communicate with one or more TRPs in a CoMP network, where each TRP may be a base station, an antenna of a base station, a DU, and/or the like. Furthermore, although the CoMP network is shown in FIGS. 8A-8C as including two TRPs, in practice, the CoMP network may include more than two TRPs. Alternatively, in some aspects, the CoMP network may include a single TRP that handles uplink traffic for multiple UEs (e.g., in an uplink massive MIMO deployment) that communicate with the single TRP using CoMP techniques. In some aspects, the CoMP network shown in FIGS. 8A-8C may generally be similar to the CoMP network described in further detail above with respect to FIGS. 7A-7B.

As shown in FIG. 8A, and by reference number 805, a UE in a cooperative transmission group may determine one or more joint transmission capabilities associated with the cooperative transmission group based at least in part on one or more capabilities of other UEs in the cooperative transmission group that have a valid network identity. For example, as described above, the CoMP network may be associated with a particular MNO, and the UE and one or more of the other UEs in the cooperative transmission group may have a subscription with the particular MNO. Accordingly, in some aspects, the UE may determine a network-allocated identifier (e.g., a C-RNTI) associated with the other UEs that have a valid network identity and further determine one or more joint transmission capabilities that are supported by the UE and the other UEs that have a valid network identity.

For example, in some aspects, the UE and the other UEs in the cooperative transmission group may have capabilities to utilize transmit diversity precoding for higher spatial diversity, reliability, and/or the like, in a similar manner as a CoMP network in which multiple TRPs exploit spatial diversity to transmit on a downlink. For example, the transmit diversity precoding may exploit an inter-UE Alamouti space-time block coding, frequency coding, and/or the like (e.g., transmitting multiple copies of a data stream across multiple antennas to improve reliability of a data transfer in a manner that may overcome scattering, reflection, refraction, thermal noise, and/or the like in propagation paths between the cooperating UEs and the TRPs).

Additionally, or alternatively, in some aspects, the other UEs in the cooperative transmission group may have a capability to relay additional data streams for a primary UE (e.g., in cases where the primary UE is suffering from a congested uplink, one or more obstacles are causing attenuation for signals transmitted by the primary UE, and/or the like). In this case, whereas the transmit diversity precoding may be used to transmit multiple copies of a data stream across multiple antennas (e.g., with some antenna(s) of the primary UE and some antenna(s) of the other cooperating UEs), the primary UE and the cooperating UEs may transmit different data streams.

Additionally, or alternatively, in some aspects, the UE and the other UEs in the cooperative transmission group may have capabilities to support one or more joint transmit beamforming techniques. For example, in some aspects, the joint transmit beamforming techniques may include using an SVD-based joint transmit precoder and/or using single user (SU)-MIMO transmit precoders at each UE in the cooperative transmission group (e.g., in cases where the CoMP network includes multiple TRPs that can jointly process an uplink transmission from the cooperative transmission group). Additionally, or alternatively, in cases where the CoMP network includes multiple TRPs that cannot jointly process an uplink transmission from the cooperative transmission group (e.g., due to backhaul limitations), the joint transmit beamforming techniques may use a BD-ZF transmit precoder to fully suppress inter-TRP interference. Additionally, or alternatively, in cases where the CoMP network includes multiple TRPs that support serial interference cancellation, the joint transmit beamforming techniques may use a transmit precoder with relaxed beamforming nulling in a similar manner as described above with reference to FIGS. 7A-7B.

As further shown in FIG. 8A, and by reference number 810, the UE may determine upgraded local transmission capabilities based at least in part on the cooperative transmission group including one or more UEs that lack a valid network identity that enables the TRP(s) to schedule an uplink transmission from such UEs (e.g., one or more UEs that are associated with a different MNO). For example, assuming that the UE has a first antenna configuration (e.g., a 4×4 panel) and another UE without a valid network identifier has a second antenna configuration (e.g., a 4×4 antenna panel), the UE may determine a temporary upgraded transmission capability that combines the first antenna configuration and the second antenna configuration (e.g., two 4×4 antenna panels that can be used for joint transmission on an uplink).

As further shown in FIG. 8A, and by reference number 815, the UE may transmit, to one or more TRPs in the CoMP network, a report that indicates network identities and capabilities of the cooperative transmission group. For example, in some aspects, the report may include a network identity associated with the UE transmitting the report and network identities associated with any cooperating UEs that have a valid network identity (e.g., a C-RNTI) that enables the TRP(s) to communicate with the cooperating UEs. Furthermore, as described above, the capabilities indicated in the report may generally indicate whether the various UEs in the cooperative transmission group support diversity-oriented inter-UE transmit precoding, relay-based precoding, SVD-based joint transmit precoding, SU-MIMO transmit precoding, BD-ZF transmit precoding, relaxed BD-ZF transmit precoding, and/or the like. In some aspects, in cases where relay-based precoding is to be used, the report can further indicate (e.g., in an enhanced scheduling request) information related to one or more data streams to be relayed by one or more other UEs in the cooperative transmission group rather than having the other UEs send separate scheduling requests for the data stream(s) to be relayed. Additionally, or alternatively, in cases where the cooperative transmission group includes one or more cooperating UEs without a valid network identity in the CoMP network, the report may indicate the upgraded transmission capabilities that combines transmission capabilities of the UE transmitting the report with transmission capabilities of the other UE(s) lacking a valid network identity. Furthermore, in some aspects, the report may be associated with a timer to indicate a valid time period associated with the cooperative transmission group (e.g., a time period during which the multiple UEs in the cooperative transmission group will be pooling communication and/or processing resources to jointly transmit data on an uplink).

As further shown in FIG. 8A, and by reference number 820, the one or more TRPs may configure an uplink transmit precoder based at least in part on the joint transmission capabilities indicated in the report and an availability of a backhaul used to coordinate receive processing on the network-side. For example, as described above, uplink CoMP gains can generally be achieved through joint processing of uplink transmissions among multiple TRPs, which may be coordinated over the backhaul. However, in some cases, network-side joint processing of uplink transmissions may be unavailable (e.g., due to heavy loading over the backhaul, heavy loading on one or more network devices coordinating communication over the backhaul, and/or the like). Accordingly, in some cases, the TRPs may configure the uplink transmit precoder for non-coherent uplink transmission in cases where the backhaul is available and/or satisfies one or more conditions (e.g., where the backhaul is associated with a threshold latency or otherwise permits joint processing of uplink transmissions by multiple TRPs). Alternatively, in some aspects, the TRPs may configure the uplink transmit precoder for coherent uplink transmission in cases where the backhaul is unavailable and/or otherwise fails to satisfy the one or more conditions (e.g., where the backhaul is associated with a latency that fails to satisfy a threshold or otherwise does not permit joint processing of uplink transmissions by multiple TRPs).

As shown in FIG. 8B, and by reference number 825, the various UEs in the cooperative transmission group may coordinate a non-coherent uplink transmission based at least in part on the TRPs configuring the uplink transmit precoder for non-coherent uplink transmission. In some aspects, the TRPs may configure the uplink transmit precoder in one or more messages (e.g., downlink control information) scheduling the uplink transmission. In this case, where the uplink transmit precoder is configured for non-coherent uplink transmission, the uplink transmit precoder may be configured to utilize transmit diversity precoding for two or more UEs that have a valid network identity, relay-based precoding for two or more UEs that have a valid network identity, upgraded transmission capabilities that exploits transmission capabilities of one or more UEs that lack a valid network identity, and/or the like.

As further shown in FIG. 8B, and by reference number 830, the UE and the other cooperating UEs may jointly transmit the uplink transmission. For example, the UE may provide one or more data streams to the other cooperating UEs, and each UE may transmit the same set of one or more data streams in cases where the uplink transmit precoder is configured to utilize transmit diversity precoding. Alternatively, in cases where relay-based precoding is used, the UE and the other cooperating UEs may transmit different sets of one or more data streams. As further shown in FIG. 8B, and by reference number 835, the TRPs receiving the uplink transmission may then jointly process the non-coherent uplink transmissions from the various UEs in the cooperative reception group by coordinating the joint processing over the backhaul.

As shown in FIG. 8C, and by reference number 840, the various UEs in the cooperative transmission group may coordinate a non-coherent uplink transmission based at least in part on the TRPs configuring the uplink transmit precoder for coherent uplink transmission (e.g., where backhaul coordination is unavailable, constrained, and/or the like). For example, as described above, the report provided to the TRPs may indicate whether the cooperative transmission group supports SVD-based joint transmit precoding, SU-MIMO transmit precoding, BD-ZF transmit precoding, relaxed BD-ZF transmit precoding, and/or the like. In these cases, multiple UEs in the cooperative transmission group may coordinate nulling in transmit beamforming such that the TRPs observes only interference levels that the respective TRPs can tolerate. For example, in cases, the TRPs may be incapable of tolerating interference or only have a limited ability to tolerate interference, in which case the TRPs may configure the uplink transmit precoder for BD-ZF transmit precoding to fully suppress interference. In other cases, where the TRPs support serial interference cancellation in one or more directions, the TRPs may configure the uplink transmit precoder for relaxed BD-ZF transmit precoding (e.g., relaxed nulling). In other cases, where the TRPs are able to perform joint receive processing, the uplink transmit precoder may be configured for SVD-based joint transmit precoding, SU-MIMO transmit precoding, and/or the like. Accordingly, in some aspects, the TRPs may transmit a message scheduling the uplink transmission from the cooperative transmission group (e.g., in downlink control information), and the TRPs may indicate in the scheduling message the joint transmit precoding to be used for the uplink transmission (e.g., from the joint transmit beamforming techniques supported by the cooperative transmission group).

As further shown in FIG. 8C, and by reference number 845, the UE and the other cooperating UEs may jointly transmit the uplink transmission. For example, the UE and the other cooperating UEs may coherently transmit the uplink transmission according to a phase that is synchronized among the UE and the other cooperating UEs based at least in part on the joint transmit precoding configured by the TRPs. As further shown in FIG. 8C, and by reference number 840, the TRPs receiving the uplink transmission may then individually process the coherent uplink transmissions from the various UEs in the cooperative reception group. For example, the joint transmit precoding and the synchronized phase used by the UE and the other cooperating UEs may cause the uplink transmission to coherently combine at the spatial locations of the respective TRPs, which can then process the coherent uplink transmissions without having to coordinate receive processing over the (unavailable) backhaul.

As indicated above, FIGS. 8A-8C are provided as one or more examples. Other examples may differ from what is described with respect to FIGS. 8A-8C.

Figure 9:
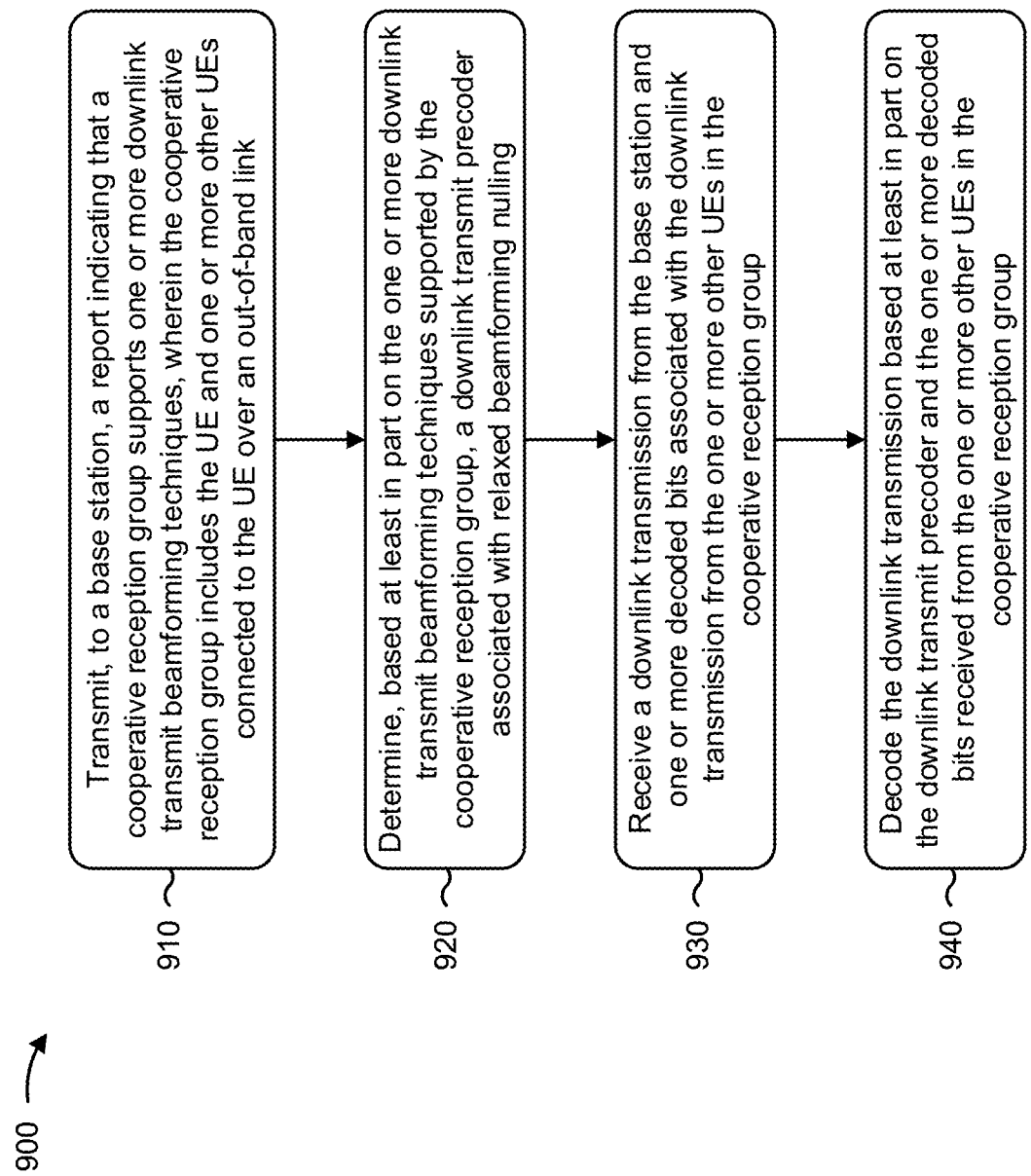
FIGS. 9-10 are diagrams illustrating example processes performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with UE cooperative reception for QoS demanding applications.

As shown in FIG. 9, in some aspects, process 900 may include transmitting, to a base station, a report indicating that a cooperative reception group supports one or more downlink transmit beamforming techniques, wherein the cooperative reception group includes the UE and one or more other UEs connected to the UE over an out-of-band link (block 910). For example, the UE may transmit (e.g., using controller/processor 280, transmit processor 264, TX MIMO processor 266, MOD 254, antenna 252, memory 282, and/or the like), to a base station, a report indicating that a cooperative reception group supports one or more downlink transmit beamforming techniques, as described above. In some aspects, the cooperative reception group includes the UE and one or more other UEs connected to the UE over an out-of-band link.

As further shown in FIG. 9, in some aspects, process 900 may include determining, based at least in part on the one or more downlink transmit beamforming techniques supported by the cooperative reception group, a downlink transmit precoder associated with relaxed beamforming nulling (block 920). For example, the UE may determine (e.g., using controller/processor 280, memory 282, and/or the like), based at least in part on the one or more downlink transmit beamforming techniques supported by the cooperative reception group, a downlink transmit precoder associated with relaxed beamforming nulling, as described above.

As further shown in FIG. 9, in some aspects, process 900 may include receiving a downlink transmission from the base station and one or more decoded bits associated with the downlink transmission from the one or more other UEs in the cooperative reception group (block 930). For example, the UE may receive (e.g., using antenna 252, DEMOD 254, MIMO detector 256, receive processor 258, controller/processor 280, memory 282, and/or the like) a downlink transmission from the base station and one or more decoded bits associated with the downlink transmission from the one or more other UEs in the cooperative reception group, as described above.

As further shown in FIG. 9, in some aspects, process 900 may include decoding the downlink transmission based at least in part on the downlink transmit precoder and the one or more decoded bits received from the one or more other UEs in the cooperative reception group (block 940). For example, the UE may decode (e.g., using controller/processor 280, memory 282, and/or the like) the downlink transmission based at least in part on the downlink transmit precoder and the one or more decoded bits received from the one or more other UEs in the cooperative reception group, as described above.

Process 900 may include additional aspects, such as any single aspect or any combination of aspects described below and/or in connection with one or more other processes described elsewhere herein.

In a first aspect, the relaxed beamforming nulling includes no nulling based at least in part on the report indicating that the cooperative reception group supports SVD-based transmit beamforming.

In a second aspect, alone or in combination with the first aspect, the report indicates that the cooperative reception group supports the SVD-based transmit beamforming based at least in part on the out-of-band link satisfying one or more performance criteria.

In a third aspect, alone or in combination with one or more of the first and second aspects, the relaxed beamforming nulling includes relaxed BD-ZF nulling based at least in part on the report indicating that the cooperative reception group supports serial interference cancellation.

In a fourth aspect, alone or in combination with one or more of the first through third aspects, the report further indicates one or more of a communication direction, a number of spatial layers, a number of resource blocks, or a decoding time associated with the serial interference cancellation.

In a fifth aspect, alone or in combination with one or more of the first through fourth aspects, the report further indicates network-allocated identifiers assigned to the UE and the one or more other UEs in the cooperative reception group to enable the base station to schedule the downlink transmission to the UE and the one or more other UEs in the cooperative reception group.

In a sixth aspect, alone or in combination with one or more of the first through fifth aspects, the report is associated with a timer indicating a valid time period associated with the cooperative reception group.

In a seventh aspect, alone or in combination with one or more of the first through sixth aspects, process 900 further includes receiving, from the base station, a scheduling message related to the downlink transmission, where the scheduling message includes information related to the downlink transmit precoder to be used to decode the downlink transmission.

In an eighth aspect, alone or in combination with one or more of the first through seventh aspects, the report includes information indicating that the UE has an upgraded reception capability based at least in part on a first antenna configuration associated with the UE and a second antenna configuration associated with another UE in the cooperative reception group.

In a ninth aspect, alone or in combination with one or more of the first through eighth aspects, the report indicates that the UE has the upgraded reception capability based at least in part on the other UE lacking an identifier enabling the base station to schedule the downlink transmission to the other UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
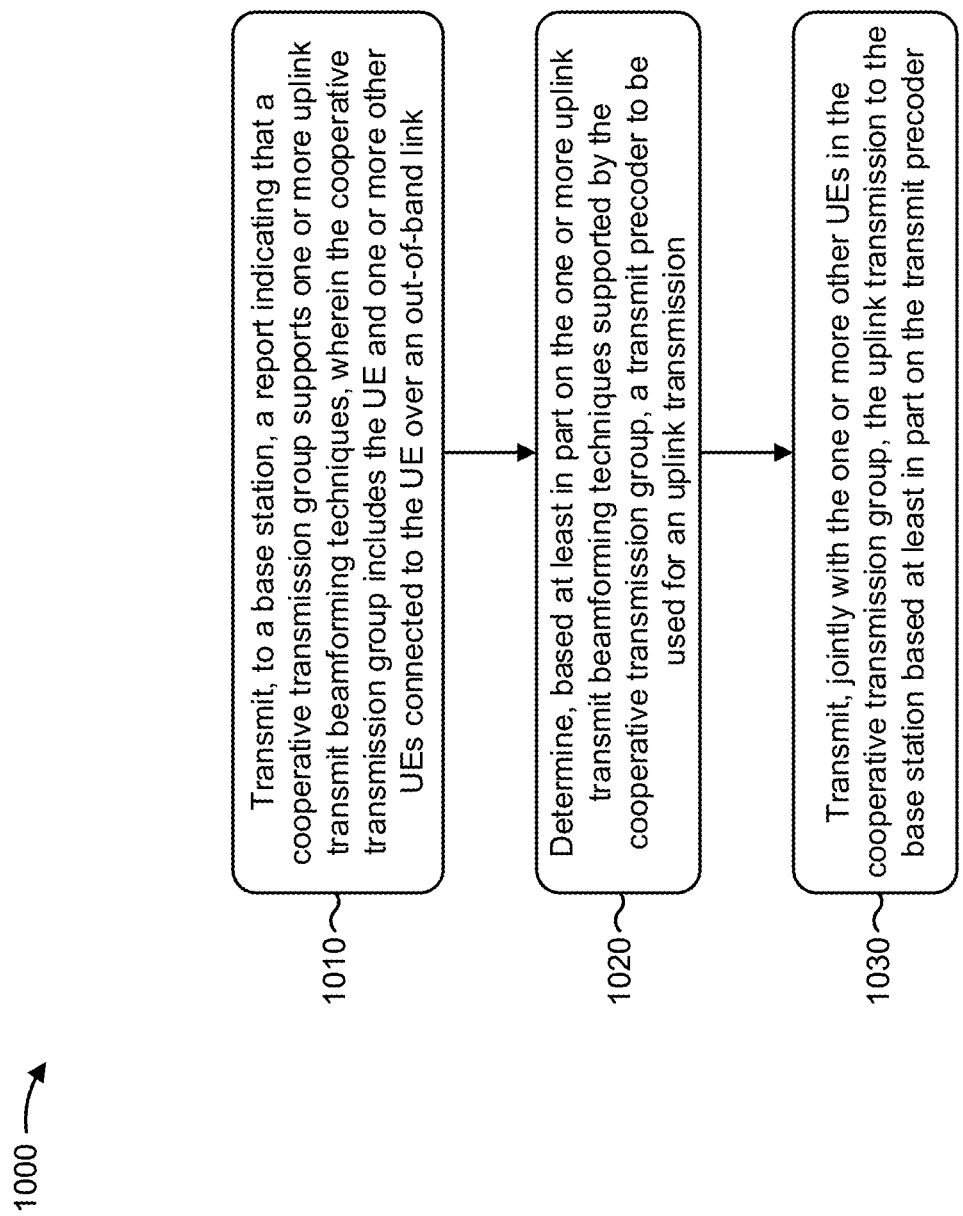

FIG. 10 is a diagram illustrating an example process 1000 performed, for example, by a UE, in accordance with various aspects of the present disclosure. Example process 1000 is an example where a UE (e.g., UE 120 and/or the like) performs operations associated with UE cooperative transmission for QoS demanding applications.

As shown in FIG. 10, in some aspects, process 1000 may include transmitting, to a base station, a report indicating that a cooperative transmission group supports one or more uplink transmit beamforming techniques, wherein the cooperative transmission group includes the UE and one or more other UEs connected to the UE over an out-of-band link (block 1010). For example, the UE may transmit (e.g., using controller/processor 280, transmit processor 264, TX MIMO processor 266, MOD 254, antenna 252, memory 282, and/or the like), to a base station, a report indicating that a cooperative transmission group supports one or more uplink transmit beamforming techniques, as described above. In some aspects, the cooperative transmission group includes the UE and one or more other UEs connected to the UE over an out-of-band link.

As further shown in FIG. 10, in some aspects, process 1000 may include determining, based at least in part on the one or more uplink transmit beamforming techniques supported by the cooperative transmission group, a transmit precoder to be used for an uplink transmission (block 1020). For example, the UE may determine (e.g., using controller/processor 280, memory 282, and/or the like), based at least in part on the one or more uplink transmit beamforming techniques supported by the cooperative transmission group, a transmit precoder to be used for an uplink transmission, as described above.

As further shown in FIG. 10, in some aspects, process 1000 may include transmitting, jointly with the one or more other UEs in the cooperative transmission group, the uplink transmission to the base station based at least in part on the transmit precoder (block 1030). For example, the UE may transmit (e.g., using controller/processor 280, transmit processor 264, TX MIMO processor 266, MOD 254, antenna 252, memory 282, and/or the like), jointly with the one or more other UEs in the cooperative transmission group, the uplink transmission to the base station based at least in part on the transmit precoder, as described above.

Process 1000 may include additional aspects, such as any single aspect or any combination of aspects described below and/or in connection with one or more other processes described elsewhere herein.

In a first aspect, the cooperative transmission group is either a non-coherent cooperative transmission group or a coherent cooperative transmission group based at least in part on availability of joint receive processing at the base station.

In a second aspect, alone or in combination with the first aspect, the one or more uplink transmit beamforming techniques supported by the cooperative transmission group include inter-UE transmit diversity precoding based at least in part on inter-UE space-time or frequency coding.

In a third aspect, alone or in combination with one or more of the first and second aspects, process 1000 further includes receiving, from the base station, a message scheduling the uplink transmission, where the message scheduling the uplink transmission indicates one of the uplink transmit beamforming techniques supported by the cooperative transmission group that is to be used as the transmit precoder for the uplink transmission.

In a fourth aspect, alone or in combination with one or more of the first through third aspects, process 1000 further includes transmitting one or more data streams associated with the uplink transmission to the one or more other UEs in the cooperative transmission group, where the report indicates that the one or more other UEs in the cooperative transmission group are to relay the one or more data streams to the base station.

In a fifth aspect, alone or in combination with one or more of the first through fourth aspects, the report includes information indicating that the UE has an upgraded transmission capability based at least in part on a first antenna configuration associated with the UE and a second antenna configuration associated with another UE in the cooperative transmission group.

In a sixth aspect, alone or in combination with one or more of the first through fifth aspects, the report indicates that the UE has the upgraded transmission capability based at least in part on the other UE lacking an identifier enabling the base station to schedule the uplink transmission for the other UE.

In a seventh aspect, alone or in combination with one or more of the first through sixth aspects, the report is associated with a timer indicating a valid time period associated with the cooperative transmission group.

In an eighth aspect, alone or in combination with one or more of the first through seventh aspects, the transmit precoder is based at least in part on one or more of BD-ZF or partial nulling to suppress interference associated with the cooperative transmission group.

In a ninth aspect, alone or in combination with one or more of the first through eighth aspects, the UE and the one or more other UEs in the cooperative transmission group jointly transmit the uplink transmission based at least in part on a phase synchronized among the UE and the one or more other UEs in the cooperative transmission group to suppress the interference.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, to a base station, a report indicating that a cooperative reception group supports one or more downlink transmit beamforming techniques, wherein the cooperative reception group includes the UE and one or more other UEs connected to the UE over an out-of-band link;
   determining, based at least in part on the one or more downlink transmit beamforming techniques supported by the cooperative reception group, a downlink transmit precoder associated with relaxed beamforming nulling;
   receiving a downlink transmission from the base station and one or more decoded bits associated with the downlink transmission from the one or more other UEs in the cooperative reception group; and
   decoding the downlink transmission based at least in part on the downlink transmit precoder and the one or more decoded bits received from the one or more other UEs in the cooperative reception group.

2. The method of claim 1, wherein the relaxed beamforming nulling includes no nulling based at least in part on the report indicating that the cooperative reception group supports singular value decomposition (SVD)-based transmit beamforming.

3. The method of claim 2, wherein the report indicates that the cooperative reception group supports the SVD-based transmit beamforming based at least in part on the out-of-band link satisfying one or more performance criteria.

4. The method of claim 1, wherein the relaxed beamforming nulling includes relaxed block-diagonal zero-forcing nulling based at least in part on the report indicating that the cooperative reception group supports serial interference cancellation.

5. The method of claim 4, wherein the report further indicates one or more of a communication direction, a number of spatial layers, a number of resource blocks, or a decoding time associated with the serial interference cancellation.

6. The method of claim 1, wherein the report further indicates network-allocated identifiers assigned to the UE and the one or more other UEs in the cooperative reception group to enable the base station to schedule the downlink transmission to the UE and the one or more other UEs in the cooperative reception group.

7. The method of claim 1, wherein the report is associated with a timer indicating a valid time period associated with the cooperative reception group.

8. The method of claim 1, further comprising:
   receiving, from the base station, a scheduling message related to the downlink transmission, wherein the scheduling message includes information related to the downlink transmit precoder to be used to decode the downlink transmission.

9. The method of claim 1, wherein the report includes information indicating that the UE has an upgraded reception capability based at least in part on a first antenna configuration associated with the UE and a second antenna configuration associated with another UE in the cooperative reception group.

10. The method of claim 9, wherein the report indicates that the UE has the upgraded reception capability based at least in part on the other UE lacking an identifier enabling the base station to schedule the downlink transmission to the other UE.

11. A user equipment (UE) for wireless communication, comprising:
   a memory; and
   one or more processors operatively coupled to the memory, the memory and the one or more processors configured to:
      transmit, to a base station, a report indicating that a cooperative reception group supports one or more downlink transmit beamforming techniques, wherein the cooperative reception group includes the UE and one or more other UEs connected to the UE over an out-of-band link;
      determine, based at least in part on the one or more downlink transmit beamforming techniques supported by the cooperative reception group, a downlink transmit precoder associated with relaxed beamforming nulling;
      receive a downlink transmission from the base station and one or more decoded bits associated with the downlink transmission from the one or more other UEs in the cooperative reception group; and
      decode the downlink transmission based at least in part on the downlink transmit precoder and the one or more decoded bits received from the one or more other UEs in the cooperative reception group.

12. The UE of claim 11, wherein the relaxed beamforming nulling includes no nulling based at least in part on the report indicating that the cooperative reception group supports singular value decomposition-based transmit beamforming.

13. The UE of claim 11, wherein the relaxed beamforming nulling includes relaxed block-diagonal zero-forcing nulling based at least in part on the report indicating that the cooperative reception group supports serial interference cancellation.

14. The UE of claim 11, wherein the one or more processors are further configured to:
   receive, from the base station, a scheduling message related to the downlink transmission, wherein the scheduling message includes information related to the downlink transmit precoder to be used to decode the downlink transmission.

15. The UE of claim 11, wherein the report includes information indicating that the UE has an upgraded reception capability based at least in part on a first antenna configuration associated with the UE and a second antenna configuration associated with another UE in the cooperative reception group.

16. A method of wireless communication performed by a user equipment (UE), comprising:
- transmitting, to a base station, a report indicating that a cooperative transmission group supports one or more uplink transmit beamforming techniques, wherein the cooperative transmission group includes the UE and one or more other UEs connected to the UE over an out-of-band link;
- determining, based at least in part on the one or more uplink transmit beamforming techniques supported by the cooperative transmission group, a transmit precoder to be used for an uplink transmission; and
- transmitting, jointly with the one or more other UEs in the cooperative transmission group, the uplink transmission to the base station based at least in part on the transmit precoder.

17. The method of claim 16, wherein the cooperative transmission group is either a non-coherent cooperative transmission group or a coherent cooperative transmission group based at least in part on availability of joint receive processing at the base station.

18. The method of claim 16, wherein the one or more uplink transmit beamforming techniques supported by the cooperative transmission group include inter-UE transmit diversity precoding based at least in part on inter-UE space-time or frequency coding.

19. The method of claim 16, further comprising:
- receiving, from the base station, a message scheduling the uplink transmission, wherein the message scheduling the uplink transmission indicates one of the uplink transmit beamforming techniques supported by the cooperative transmission group that is to be used as the transmit precoder for the uplink transmission.

20. The method of claim 16, further comprising:
- transmitting one or more data streams associated with the uplink transmission to the one or more other UEs in the cooperative transmission group, wherein the report indicates that the one or more other UEs in the cooperative transmission group are to relay the one or more data streams to the base station.

21. The method of claim 16, wherein the report includes information indicating that the UE has an upgraded transmission capability based at least in part on a first antenna configuration associated with the UE and a second antenna configuration associated with another UE in the cooperative transmission group.

22. The method of claim 21, wherein the report indicates that the UE has the upgraded transmission capability based at least in part on the other UE lacking an identifier enabling the base station to schedule the uplink transmission for the other UE.

23. The method of claim 16, wherein the report is associated with a timer indicating a valid time period associated with the cooperative transmission group.

24. The method of claim 16, wherein the transmit precoder is based at least in part on one or more of block-diagonal zero-forcing or partial nulling to suppress interference associated with the cooperative transmission group.

25. The method of claim 24, wherein the UE and the one or more other UEs in the cooperative transmission group jointly transmit the uplink transmission based at least in part on a phase synchronized among the UE and the one or more other UEs in the cooperative transmission group to suppress the interference.

26. A user equipment (UE) for wireless communication, comprising:
- a memory; and
- one or more processors operatively coupled to the memory, the memory and the one or more processors configured to:
  - transmit, to a base station, a report indicating that a cooperative transmission group supports one or more uplink transmit beamforming techniques, wherein the cooperative transmission group includes the UE and one or more other UEs connected to the UE over an out-of-band link;
  - determine, based at least in part on the one or more uplink transmit beamforming techniques supported by the cooperative transmission group, a transmit precoder to be used for an uplink transmission; and
  - transmit, jointly with the one or more other UEs in the cooperative transmission group, the uplink transmission to the base station based at least in part on the transmit precoder.

27. The UE of claim 26, wherein the cooperative transmission group is either a non-coherent cooperative transmission group or a coherent cooperative transmission group based at least in part on availability of joint receive processing at the base station.

28. The UE of claim 26, wherein the one or more processors are further configured to:
- receive, from the base station, a message scheduling the uplink transmission, wherein the message scheduling the uplink transmission indicates one of the uplink transmit beamforming techniques supported by the cooperative transmission group that is to be used as the transmit precoder for the uplink transmission.

29. The UE of claim 26, wherein the report includes information indicating that the UE has an upgraded transmission capability based at least in part on a first antenna configuration associated with the UE and a second antenna configuration associated with another UE in the cooperative transmission group.

30. The UE of claim 26, wherein the transmit precoder is based at least in part on one or more of block-diagonal zero-forcing or partial nulling to suppress interference associated with the cooperative transmission group.

* * * * *